United States Patent
Hoymann et al.

(10) Patent No.: US 8,942,758 B2
(45) Date of Patent: Jan. 27, 2015

(54) METHOD AND DEVICE FOR LINK-CHARACTERISTIC BASED SELECTION OF SUPPORTING ACCESS NODES

(75) Inventors: Christian Hoymann, Aachen (DE); Laetitia Falconetti, Aachen (DE); Arne Simonsson, Gammelstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 969 days.

(21) Appl. No.: 13/120,766

(22) PCT Filed: Aug. 17, 2009

(86) PCT No.: PCT/EP2009/060636
§ 371 (c)(1),
(2), (4) Date: May 18, 2011

(87) PCT Pub. No.: WO2010/034571
PCT Pub. Date: Apr. 1, 2010

(65) Prior Publication Data
US 2011/0218010 A1    Sep. 8, 2011

Related U.S. Application Data

(60) Provisional application No. 61/100,384, filed on Sep. 26, 2008.

(30) Foreign Application Priority Data

Apr. 28, 2009   (WO) ................ PCT/EP2009/055157

(51) Int. Cl.
| | |
|---|---|
| *H04W 48/20* | (2009.01) |
| *H04B 7/04* | (2006.01) |
| *H04B 7/02* | (2006.01) |
| *H04B 17/00* | (2006.01) |
| *H04W 28/04* | (2009.01) |

(52) U.S. Cl.
CPC ............ *H04B 7/024* (2013.01); *H04B 17/0077* (2013.01); *H04W 28/04* (2013.01)
USPC ......................... 455/525; 455/513; 455/67.11

(58) Field of Classification Search
None
See application file for complete search history.

(56) References Cited

U.S. PATENT DOCUMENTS

| | | |
|---|---|---|
| 2006/0120477 A1 | 6/2006 | Shen et al. |
| 2009/0111473 A1* | 4/2009 | Tao et al. ................. 455/440 |

FOREIGN PATENT DOCUMENTS

EP         1852984 A2    11/2007

OTHER PUBLICATIONS

Jiang, W. et al. "Base Station Cooperation Based on Location-Aided in Cellular System." Canadian Conference on Electrical and Computer Engineering, 2009 (CCECE '09), May 3-6, 2009, pp. 157-160; St. John's, NL, CA.

(Continued)

*Primary Examiner* — Philip Sobutka
(74) *Attorney, Agent, or Firm* — Coats & Bennett, PLLC

(57) ABSTRACT

For uplink cooperation of a serving access node (100-1) one or more supporting access nodes (100-2) are selected. The selection is based on a characteristic of a link between a terminal (200) served by the serving access node (100-1) and the supporting access node (100-2), or is based on a characteristic of a link between a further terminal (200') served by the supporting access node (100-2) and the serving access node (100-1). The characteristics of the links may comprise a signal quality, e.g. a path gain, a signal strength, or a latency. The characteristics of the links may also comprise scheduling information, e.g. time resources and/or frequency resources used on the link.

25 Claims, 12 Drawing Sheets

(56) References Cited

OTHER PUBLICATIONS

Kamoun, M. et al. "Base-Station Selection in Cooperative Single Frequency Cellular Network." IEEE 8th Workshop on Signal Processing Advances in Wireless Communications, 2007 (SPAWC 2007), Jun. 17-20, 2007, Helsinki, FI.

Jiang, W. et al. "Information Exchange in the Process of Establishing on Base Station Cooperation", International Conference on Networks Security, Wireless Communications and Trusted Computing, Apr. 25, 2009-Apr. 26, 2009; XP002553634 Hubei, China.

* cited by examiner

US 8,942,758 B2

METHOD AND DEVICE FOR LINK-CHARACTERISTIC BASED SELECTION OF SUPPORTING ACCESS NODES

TECHNICAL FIELD

The present invention relates to techniques for cooperation of access nodes, e.g. base stations or sections of base stations, in a mobile communication network. More specifically, the present invention relates to techniques for selecting supporting access nodes.

BACKGROUND

Cellular communication networks with tight frequency reuse and dense deployment of nodes tend to be interference-limited. Their simultaneous transmissions create co-channel interference which reduces Signal to Interference plus Noise Ratio (SINR) and therefore limits capacity. In conventional cellular communication networks, co-channel interference is reduced by Radio Resource Management such as power control, loose frequency reuse, spreading code assignments, and inter-cell interference coordination. Cellular communication networks with large signal propagation losses, due to large cell radii in rural environments or due to wall penetration for indoor users tend to be noise limited. The perceived signal attenuation, also referred to as path loss, reduces the received carrier signal strength and limits capacity.

In view of the above situation, there exist proposals to use a technique of cooperating BSs, e.g. in 3GPP LTE (3GPP: Third Generation Partnership Project, LTE: Long Term Evolution) Advanced. In this technique, Rx signals from a terminal are collected from a plurality of cooperating base stations (BSs), which allows for reducing interference and increasing the received carrier signal strength. However, no details are given how groups of cooperating BSs are established.

Accordingly, there is a need for techniques that overcome the aforementioned problems and allow for efficiently selecting access nodes to be used as supporting access nodes in uplink (UL) cooperative signal reception from a terminal.

SUMMARY

It is an object of the present invention to meet the above need. This is achieved by methods or devices according to the independent claims. The dependent claims define further embodiments of the invention.

According to an aspect of the invention, a method of UL cooperative signal reception from a terminal is provided. The terminal is associated with a serving access node. According to the method, a characteristic of a first link from the terminal to a further access node is determined. In addition or as an alternative, a characteristic of a second link from a further terminal to the serving access node is determined, the further terminal being associated with a further access node, which serves the further terminal. On the basis of the determined characteristic of the first link and/or on the basis of the determined characteristic of the second link, the further access node is selected as supporting access node for uplink cooperative signal reception.

According to a further aspect of the invention, a computer program is provided. The computer program is executable by a processor of an access node. The computer program comprises code causing the processor of the access node to control execution of steps of a method according to the above aspect.

According to a further aspect of the invention, a computer-readable medium is provided which comprises a computer program according to the above aspect.

According to a further aspect of the invention, a network device is provided. The network device is configured to operate as a serving access node of a terminal. The network device comprises a processor. The processor is configured to determine a characteristic of a first link from the terminal to a further access node. In addition or as an alternative, the processor is configured to determine a characteristic of a second link from a further terminal to the serving access node, the further terminal being associated with a further access node which serves the further terminal. The processor is configured to select, on the basis of the determined characteristic of the first link and/or on the basis of the determined characteristic of the second link, the further access node as supporting access node for uplink cooperative signal reception.

DETAILED DESCRIPTION OF EMBODIMENTS

Figure 1:
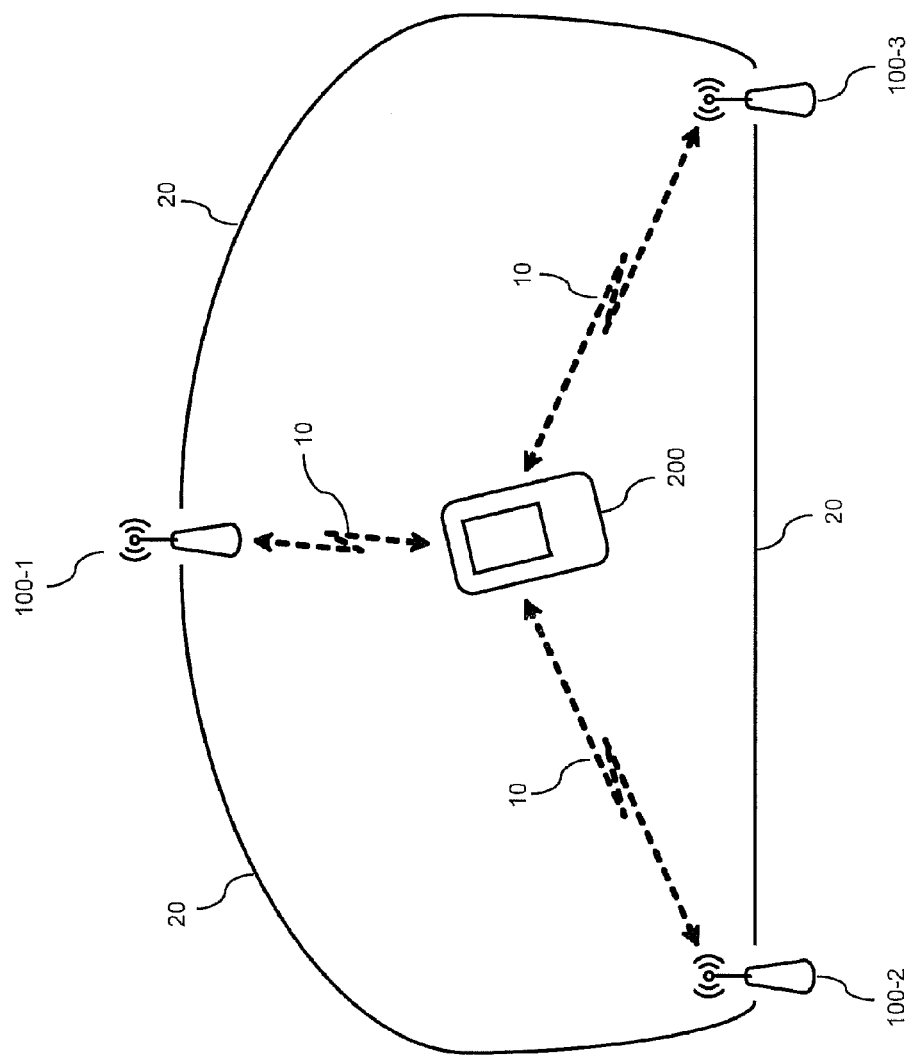
FIG. 1 schematically illustrates a communication network environment in which concepts according to embodiments of the present invention can be applied.

In the following, the invention will be explained in more detail by referring to exemplary embodiments which relate to methods, devices and computer programs for uplink cooperation of access nodes, in particular base stations. More specifically, the exemplary embodiments as described in the following relate to techniques of selecting supporting access nodes for cooperative signal communication, in particular UL cooperative signal reception.

An access node can be embodied in a BS, e.g. an enhanced-NodeB (eNB) according to LTE terminology, or a relay node, e.g. a type-1 relay node according to LTE terminology, or a section of a BS. or a relay node. A section of a BS or of a relay node may be regarded as a unit to cover a cell area of a cellular radio frequency (RF) communication network. An access node may therefore correspond to a cell of the RF communication network. An access node typically comprises one or more antennas, RF-parts such as filters and power-amplifiers or low-noise amplifiers, and signal processing means. Cooperative signal communication may be achieved via at least two access nodes, e.g. a first BS and a second BS, a first section of a first BS and a second section of the same BS or of a second BS, and/or a first relay node and a second relay node, a first section of a first relay node and a second section of the same relay node or of a second relay node. Cooperation between different access nodes may also be denoted as inter-base-station cooperation, inter-eNB cooperation, or inter-relay-node cooperation, and section-to-section-cooperation of the same BS or relay node may also be denoted as intra-base-station cooperation, intra-eNB cooperation, or intra-relay node cooperation. Also, it is to be understood that cooperation could also be implemented between different types of access nodes, e.g. between a BS or section of a BS and a relay node or section of a relay node.

In the description of the following embodiments, the terms "access node" and "base station", and "relay node" are used in a synonymous manner. This has been done for legibility and illustrative reasons and is not meant to exclude section-to-section cooperation, be it with the same or between different base stations (or relay nodes), from being applicable to the following embodiments.

In the following, schemes and concepts of supporting access node selection for UL cooperative signal reception from a terminal are described. According to these techniques, a serving access node is associated with the terminal. The serving access node controls communication of the terminal with the communication network and can select one or more further access nodes to be used as supporting access nodes. This selection is accomplished on the basis of a characteristic of a link. This link may extend from the terminal to the further access node, i.e. be arranged between the terminal and the further access node. This link may also be extend between a further terminal served by a further access node and the serving access node, i.e. be a link arranged between the further terminal and the serving access node. According to some embodiments, the selection may be based on a comparison of the characteristic with a corresponding characteristic of another link. For example, the characteristic of the link between the terminal and the further access node can be compared to the corresponding characteristic of the link between the terminal and the serving access node. Further, a characteristic of the link between the further terminal and the serving access node can be compared to a characteristic of the link between the terminal and the serving access node. The characteristic may comprise a signal quality of the link, e.g. a received signal strength, a path gain, a latency, or the like. Further, the characteristic may comprise scheduling information of the link, e.g. resource blocks scheduled on the link. The scheduling information may relate to frequency resources used on the link and/or to time resources, e.g. time slots, used on the link. Further, the scheduling information may also comprise a transmit (Tx) power, a code, or a polarization used on the link. Moreover, the scheduling information may also comprise spatial information, e.g. related to beamforming techniques or an arrangement of different antennas used for the link.

The characteristic may be determined from a measurement report for the respective link. The measurement report can be established on the basis of a measurement at the terminal, at the further terminal, at the further access node, or at the serving access node. The measurement report may be received at the serving access node from the terminal, from the further access node, or from the further access node. For example, a measurement report for the link between the terminal and the further access node may be established by a measurement at the terminal, and then be sent to the serving access node, directly or via the further access node. Further, a measurement report for the link between the terminal and the further access node may be established by a measurement at the further access node, and then be sent to the serving access node. Such a measurement at the further access node can be accomplished on the basis of a reference signal transmitted from the terminal to the further access node. In the latter case, the serving access node may transmit scheduling information of the reference signal to the further access node. The scheduling information of the reference signal can then be used by the further access node for evaluating the reference signal.

A measurement at the serving access node, for determining the characteristic of the link between the serving access node and the terminal or for determining the characteristic of the link between the serving access node and the further terminal, may be accomplished on the basis of a reference signal as well. If the measurement is accomplished on the basis of a reference signal transmitted by the further terminal, the further access node serving the further terminal may transmit scheduling information of the reference signal to the serving access node. The scheduling information of the reference signal can then be used by the serving access node for evaluating the reference signal.

The above-mentioned scheduling information of the reference signal may relate to frequency resources used by the reference signal and/or to time resources, e.g. time slots, used by the reference signal. In addition, the scheduling information of the reference signal may also comprise information relating to a sequence of reference symbols in the reference signal. Further, the scheduling information of the reference signal may also comprise a transmit (Tx) power, a code, or a polarization used on by the reference signal. Moreover, the scheduling information may also comprise spatial information, e.g. related to beamforming techniques or an arrangement of different antennas used for reference signal.

The most promising further access nodes, e.g. co-channel BSs, can thus be selected by the serving access node to participate as supporting access nodes in the cooperative reception of signals.

In the following, various types of link-characteristic based supporting access node selection according to embodiments of the invention are described.

According to a first type of link-characteristic based selection, a characteristic of a first link is determined, which is arranged between the terminal and the further access node. With respect to the terminal, this further access node typically has no control functionalities. Accordingly, this further access node may also be referred to as non-serving with respect to the terminal. On the basis of this characteristic, the further access node can be selected to be used as supporting access node, e.g. if the characteristic indicates sufficient signal quality, such as a received signal strength above a certain threshold, a path gain above a certain threshold, or a latency below a certain threshold. By using information with respect to the signal received from the terminal at such supporting access nodes, the serving access node can increase the received carrier signal energy received from the terminal. In this way, cell edge throughput in noise limited scenarios can be significantly improved. This first type of link-characteristic based selection basically aims at selecting supporting access nodes that can increase the amount of carrier signal energy received from the terminal.

According to a second type of link-characteristic based selection, a characteristic of a link between the serving access node and a further terminal associated with a further access node is determined. Typically, the further access node will be a serving access node of the further terminal. On the basis of the characteristic, the further access node can be selected to be used as supporting access node, e.g. if the characteristic indicates that an interfering signal strength of the further terminal at the serving access node is expected to be high. By cooperating with a supporting access node associated with such a strongly interfering terminal, the serving access node can control and mitigate the interfering signals. This second type of link-characteristic based selection is beneficial in interference limited scenarios.

Here, it is to be understood that the above-described first type and second type of link-characteristic based selection can be combined with each other. That is to say, the serving access node can select one or more supporting access nodes suitable for increasing the amount of carrier signal energy and one or more supporting access nodes suitable for mitigating interference.

In the following, embodiments of the present invention will be explained in more detail by referring to the accompanying drawings.

FIG. 1 shows a mobile communication network environment, in which concepts according to embodiments of the present invention may be applied. For example, the mobile communication network environment may be an LTE network. The mobile communication network environment comprises a plurality of access nodes 100-1, 100-2, 100-3 and a mobile terminal 200. In addition, further mobile terminals may be present. In the following, it will be assumed that the access nodes 100-1, 100-2, 100-3 are BSs of the communication network. However, it is to be understood that the access nodes may also be sections of the same BS or of different BSs, relay nodes, or sections of the same relay node or of different relay nodes. Also, it is to be understood that the access nodes may each correspond to different cells of the mobile communication network. The terminal 200 may be a mobile phone, a portable computer or other type of user equipment (UE). In the following the terminal will thus also be referred to as UE.

The BSs 100-1, 100-2, 100-3 may cooperatively communicate with the terminal 200 by transmitting, i.e. sending and/or receiving, a communication signal 10 on different communication paths, i.e. a first communication path between the BS 100-1 and the terminal 200, a second communication path between the BS 100-2 and the terminal 200, and a third communication path between the BS 100-3 and the terminal 200. The above-mentioned communication paths correspond to different links established between the terminal and the BSs. In this connection, it is to be understood that a link may carry signals in the UL direction and/or in the downlink (DL) direction. One of the BSs, e.g. the BS 100-1, may be a serving BS, and the other BSs, e.g. the BSs 100-2, 100-3, may be supporting BSs. Cooperative reception of the communication signal 10 by the BSs 100-1, 100-2, 100-3 may also be referred to as UL cooperation, whereas cooperative transmission of the communication signal from the BSs 100-1, 100-2, 100-3 may also be referred to as DL cooperation. For cooperatively receiving the communication signal 10, the BSs 100-1, 100-2, 100-3 exchange information concerning individual Rx signals from the terminal 200, e.g. the supporting BS 100-2 may transmit information relating to the Rx signal from the terminal 200 to the serving BS 100-1, and the supporting BS 100-3 may transmit information relating to the Rx signal from the terminal 200 to the serving BS 100-1. In addition, the supporting BSs 100-2, 100-3 may also transmit information relating to Rx signals received from further terminals to the serving BS 100-1. For this purpose, the BSs 100-1, 100-2, 100-3 exchange a cooperation signal 20, e.g. via a transport network. A communication link between the access nodes 100-1, 100-2, 100-3, which may be used for communicating the cooperation signal, may also be referred to as backhaul link.

It is to be understood that an arbitrary number of access nodes could participate in the cooperative reception. For example, there could be only one supporting access node or there could be two, three, four or more supporting access nodes.

Figure 2:
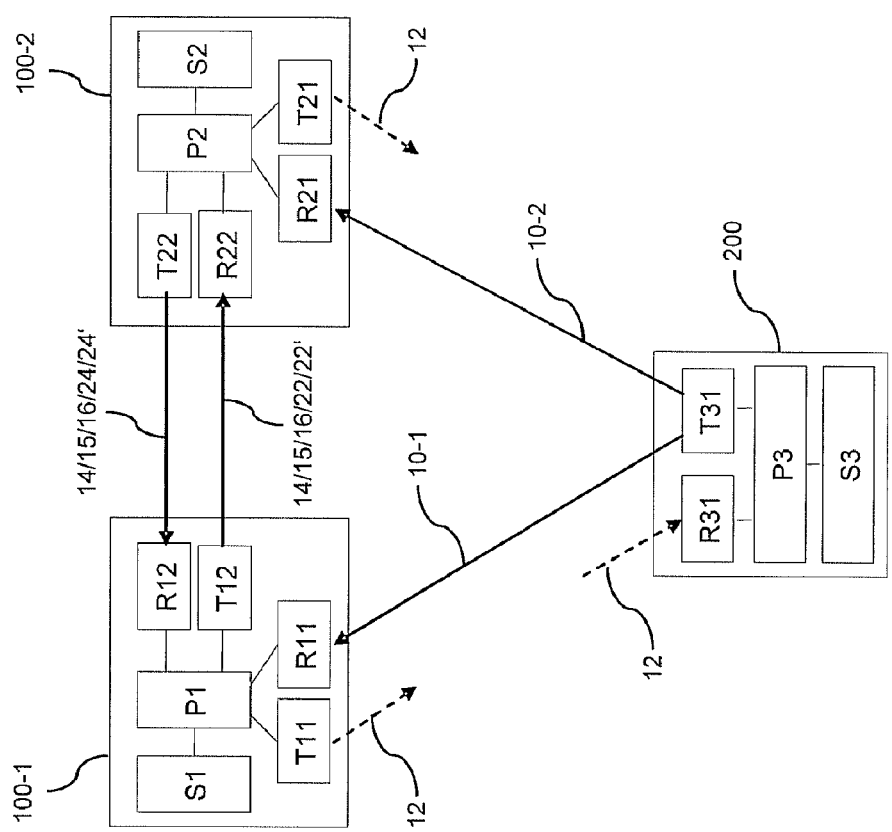
FIG. 2 schematically illustrates an implementation of devices in a communication network according to an embodiment of the invention.

FIG. 2 schematically illustrates an exemplary implementation of devices according to an embodiment of the invention which relates to UL cooperation of access nodes. Further, FIG. 2 also illustrates communication between these devices. In FIG. 2, elements which are similar to those of FIG. 1 have been designated with the same reference signs. Additional information concerning these elements can thus be obtained from the above explanations in connection with FIG. 1.

In FIG. 2, a serving access node (BS1) 100-1, e.g. a serving BS, a supporting access node (BS2) 100-2, e.g. a supporting BS, and a terminal or UE 200 are depicted. It is to be understood that the access nodes may also be section of the same BS or of different BSs. In the following, the serving access node 100-1 may also be referred to as first access node or first BS, and the supporting access node 100-2 may also be referred to as second access node or second BS. The supporting access node 100-2 may have been selected for a cooperation with the serving access node 100-1 so as to optimize the signal reception from the terminal 200, e.g. according to one or more selection criteria. The selection process will be further explained below.

For illustrative reasons, further one or more possible supporting access nodes, which may be selected as supporting access nodes or not, or further one or more access nodes that do not qualify at all for support, e.g. because there exists no link between the serving access node and these one or more further access nodes, are not depicted. Further possible terminals which could be associated to the access nodes 100-1, 100-2 or to any further access node are not depicted as well. A situation with a further terminal, which can be associated to the supporting access node 100-2 and could send a signal which interferes with signals from the terminal 200 will be explained below, in connection with FIG. 3. In such a situation, information exchanged between the serving access node 100-1 and the supporting access node 100-2, e.g. in request messages and/or response messages, may allow to mitigate or even cancel the interfering signal.

Further, it should be noted that an access node, e.g. one of the access nodes 100-1, 100-2, can be a serving access node for a particular terminal while it is a supporting access node for another terminal. If the terminal moves and a further access node takes over the role of the serving access node, the previous serving access node may take over the role of a supporting node or may not be considered anymore for cooperation.

The individual devices 100-1, 100-2, 200 each comprise one or more sub-units with a sub-unit starting with T denoting a transmission unit or transmitter, a sub-unit starting with R denoting a receiving unit or receiver, a sub-unit starting with P denoting a processing unit or processor, and a sub-unit starting with S denoting a storage unit or memory.

The terminal 200 comprises a transmission unit T31 for sending a signal 10-1 to the serving access node 100-1 and a signal 10-2 to the supporting access node 100-2. In practice, the signals 10-1 and 10-2 are typically transmitted by the terminal 200, i.e. the transmission unit T31, as one Tx signal only. Due to a, typically non-directive, antenna of the terminal 200 and the channel characteristics the Tx signal is received by the serving access node 100-1 as the Rx signal 10-1 and by the supporting access node 100-2 as the Rx signal 10-2. Typically, the terminal 200, which may be a mobile phone or the like, comprises further units as depicted, e.g. a receiving unit R31 for receiving messages 12, e.g. from the serving access node 100-1 or from the supporting access node 100-2 as illustrated by the dashed arrows, a processing unit P3 for processing information and messages, and a storage unit S3 for storing and retrieving information. It should be noted that for the concepts as described herein the receiving unit R31 is optional. However, most terminals such as mobile phones will comprise such a receiving unit. Nonetheless, it is also conceivable that the terminal 200 is a transmitter without reception functionalities, but still optionally comprising, in addition to the transmission unit T31, the processing unit P3 and/or the storage unit S3.

According to some embodiments, the processing unit P3 of the terminal 200 may be configured to measure a characteristic of a link between the serving access node 100-1 and the terminal 200, i.e. the link used for transmitting the signal 10-1 from the terminal 200 to the serving access node 100-1 and/or for transmitting the signal 12 from the serving access node 100-1 to the terminal 200. Further, the processing unit P3 may be configured to measure a characteristic of a link between the supporting access node 100-2 and the terminal 200, i.e. a link used for transmitting the signal 10-2 from the terminal 200 to the supporting access node 100-2 and for transmitting the signal 12 from the supporting access node 100-2 to the terminal 200. For example, this may be accomplished by measuring a received signal strength of the signal 12. The processor P3 may further be configured to make results of such measurements available to the access nodes 100-1, 100-2, e.g. by sending a measurement report using the signal 10-1 or the signal 10-2. In some embodiments, such a measurement report may be a path gain measurement report.

The serving access node 100-1 comprises a receiving unit R11, and the supporting access node 100-2 comprises a receiving unit R21, for receiving the signal 10-1 and 10-2, respectively, from the terminal 200. Here it is to be understood that the receiving units R11, R21 may also be used for receiving signals from possible further terminals not shown here. Typically, the serving access node 100-1 further comprises a transmission unit T11, and the supporting access node 100-2 further comprises a transmission unit T21, e.g. to transmit signals to the terminal 200 or to further terminals not shown here. It should be noted that for the concepts as described herein the transmission units T11 and T21 are optional. However, most access nodes, such as LTE BSs, will comprise such a transmission unit anyway for bi-directional communication with terminals. Nonetheless, it is also conceivable that the access nodes 100-1 and/or the access node 100-2 are, with respect to the terminal 200, implemented as a receiver without transmitting functionalities, while they do provide sending and receiving capabilities towards each other to exchange signals, e.g. messages 14, 15, 16, 22, 22', 24, 24'. As further illustrated, the access node 100-1 may comprise a processor P1, and a storage unit S1. Similarly, the access node 100-2 may comprise a processing unit P2 and a storage unit S2. The access nodes 100-1 may thus be provided with a processing capability for processing the exchanged and received information and/or with also storage capability for storing data.

According to some embodiments, the processing unit P1 is configured to determine a characteristic of the link between the serving access node 100-1 and the terminal 200. This may be accomplished by receiving the above-mentioned measurement report of the terminal 200. In addition, this may be accomplished by measuring a reference signal received from the terminal 200, e.g. a measurement of the received signal strength, a measurement of a path gain, or a measurement of a latency. Similarly, the processing unit P2 of the access node 100-2 may be configured to determine a characteristic of the link between the access node 100-2 and the terminal 200. This may be accomplished by receiving the above-mentioned measurement report of the terminal 200 or by measuring a reference signal received from the terminal 200, e.g. a measurement of the received signal strength, a measurement of a path gain, or a measurement of a latency. Moreover, the processing unit P1 in the access node 100-1 may be configured to determine a characteristic of the link between the access node 100-2 and the terminal 200. This may be accomplished by receiving a measurement report for the link from the terminal 200 or by receiving a measurement report from the access node 100-2. Similarly, the processing unit P2 in the access node 100-2 may be configured to determine a characteristic of the link between the access node 100-1 and the terminal 200. This may be accomplished by receiving the measurement report from the terminal 200 or from the access node 100-1. In FIG. 2, messages 15 are used to communicate measurement reports between the access nodes 100-1, 100-2.

In addition, the serving access node 100-1 comprises a transmission unit T12 for transmitting signals to other access nodes, e.g. to the supporting access node 100-2, and a receiving unit R12 for receiving signals from other access nodes, e.g. from the supporting access node 100-2. Similarly, the supporting access node 100-2 comprises a transmission unit T22 for transmitting signals to other access nodes, e.g. to the serving access node 100-1, and a receiving unit R22 for receiving signals from other access nodes, e.g. from the serving access node 100-1. The transmission unit T12 and the receiving unit R12 thus provide an interface of the serving access node 100-1 with respect to other access nodes, e.g. the supporting access node 100-2, and the transmission unit T22 and the receiving unit R22 thus provide an interface of the supporting access node 100-2 with respect to other access nodes, e.g. the serving access node 100-1.

Using its transmission unit T12, the serving access node 100-1 can request information relating to the signal 10-2, received at the supporting access node 100-2 from the terminal 200, from the supporting access node 100-2, e.g. by sending a request message 22 or a subscribe message 22' to the supporting access node 100-2. The request message 22 and the subscribe message will be further explained below. The supporting access node 100-2 receives the signal 10-2 via its receiving unit R21. The processing unit P2 is adapted to obtain the requested information from the received signal 10-2. The supporting access node 100-2 can send the requested information via its transmission unit T22 to the receiving unit R12 of the serving access node 100-1, e.g. in a response message 24 or in a publish message 24' as further explained below. The processing unit P1 of the serving access node is adapted to determine an optimized Rx signal from the terminal, which is accomplished on the basis on the requested information as received from the supporting access node 100-2 and on corresponding information relating to the signal 10-1, which is received by the serving access node 100-1 itself.

In addition, the interfaces of the access nodes 100-1, 100-2 with respect to other access nodes, as implemented by the transmission units T12, T22 and the receiving units R12, R22 may be used for communicating information relating to the above-mentioned link characteristics, e.g. for communicating measurement report messages 15. Similarly, information relating to a characteristic of the link between the access node 100-1 and the terminal 200 may be communicated from the access node 100-1 to the access node 100-2. As mentioned above, such characteristics communicated between the access node 100-1, 100-2 may relate to a signal quality of the link. In addition, such information may also comprise scheduling information, such as frequency resources and/or time resources, e.g. LTE Resource Blocks (RBs), and Tx power used for transmitting the signals 10-1, 10-2. The scheduling information may also comprise a code or a polarization used for transmitting the signals 10-1, 10-2. Further, the scheduling information may also comprise spatial information, such as a beamforming technique or arrangement of different antennas used for transmitting the signals 10-1, 10-2. In FIG. 2, such scheduling information is transmitted by messages 16. Moreover, in some embodiments also scheduling information of reference signals transmitted by terminals, e.g. terminal 200, can be communicated between the access nodes 100-1, 100-2, e.g. using messages 14. The scheduling information of the reference signals may comprise a reference symbol sequence, a code, polarization, time resources, frequency resources, and/or the Tx power used to transmit the reference signal. In addition, the scheduling information of the reference signal may also comprise spatial information, such as a beamforming technique or arrangement of different antennas used for transmitting the reference signal.

The processing unit P1 in the serving access node 100-1 may use the information concerning the link characteristics as a basis for deciding whether the access node 100-2 should be used as supporting access node or not. This will be further explained in connection with FIGS. 4 to 10.

Transmission unit T12 and receiving unit R22 may be connected directly, e.g. with a cable, or indirectly, e.g. through any wireless or wired transport network with intermediate switching and/or routing nodes. Similarly, transmission unit T22 and receiving unit R12 may be connected directly, e.g. with a cable, or indirectly, e.g. through any wireless or wired transport network with intermediate switching and/or routing nodes.

Accordingly, the serving access node 100-1 and the supporting access node 100-2 may communicate via dedicated physical connection, e.g. cable or fiber, directly connecting the serving access node 100-1 and the supporting access node 100-2. According to another example, the serving access node 100-1 and the supporting access node 100-2 may communicate via a switched or routed communication network with intermediate switching or routing nodes. An example for an interconnection of access nodes suitable for implementing the concepts as described herein is the interface X2 according to the 3GPP LTE specification, which is an IP-based interface being independent of the underlying transport network.

Receiving units R11 and R12 may use different communication technologies, e.g. for communicating with the terminal 200, via the transmission unit T31, a wireless communication technique such as LTE may be used, and for communicating with the supporting access node 100-2, via the transmission unit T22, a wired communication technique may be used, such as Ethernet. The same applies to the transmission units T11 and T12 as well as for the corresponding units R21 and R22 or T21 and T22 of the supporting access node 100-2. However, implementations are conceivable wherein receiving units R11 and R12 may be of the same communication technology, e.g. both wireless, even being combined into one receiving unit. The same may apply for the transmission units T11 and T12 as well for the corresponding sub-units of the supporting access node 100-2, i.e. the receiving units R21 and R22 or the transmission units T21 and T22. A receiving unit and a corresponding transmission unit in the same device, such as the receiving unit R11 and the transmission unit T11, the receiving unit R12 and the transmission unit T12, the receiving unit R21 and the transmission unit T21, the receiving unit R22 and the transmission unit T22, or the receiving unit R31 and the transmission unit T31, may be combined in a transceiving unit or transceiver.

Figure 3:
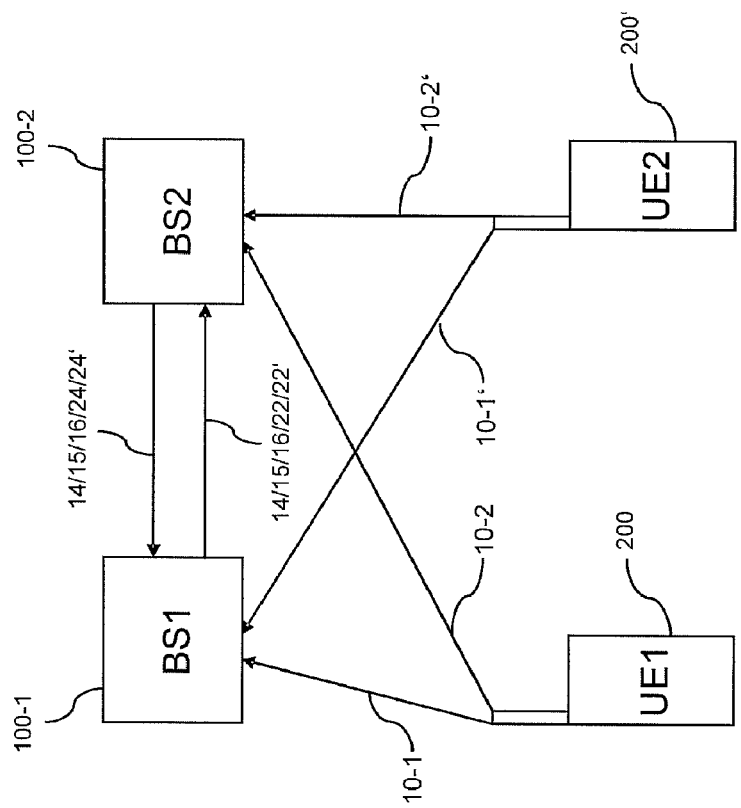
FIG. 3 schematically illustrates a further implementation of devices in a communication network according to an embodiment of the invention.

FIG. 3 schematically illustrates a further exemplary implementation of devices according to an embodiment of the invention. In addition, FIG. 3 also illustrates communication between these devices. In FIG. 3, elements which are similar to those of FIGS. 1 and 2 have been designated with the same reference signs. Additional information concerning these elements can thus be obtained from the above explanations in connection with FIGS. 1 and 2. As compared to FIG. 2, FIG. 3 illustrates a situation in which, in addition to the terminal 200, there is a further terminal 200'. The further terminal 200' may have similar structures and functionalities as the terminal 200, e.g. as shown and explained in connection with FIG. 2. In the following, the terminal 200 will also be referred to as first terminal, the further terminal 200' will also be referred to as second terminal.

As in the situation of FIG. 2, the first access node 100-1 receives the signal 10-1 from the first terminal 200, and the second access node receives the signal 10-2 from the first terminal 200. Further, the first access node 100-1 receives a signal 10-1' from the second terminal 200', and the second access node 100-2 receives a signal 10-2' from the second terminal 200'.

For the first terminal 200, the first access node 100-1 is the serving access node. In other words, the terminal 200 is associated with the first access node 100-1, and the second access node 100-2 is the supporting access node. The second access node 100-2 may further be the serving access node for the second terminal 200'. In other words, if the access node 100-2 is the serving access node for the second terminal 200', the second terminal is associated with the second access node 100-2.

In the situation of FIG. 3, there is also a link between the further terminal 200' and the access node 100-1, used for transmitting the signal 10-1', and a link between the further terminal 200' and the access node 100-2, for transmitting the signal 10-2'.

According to some embodiments, the serving access node 100-1 of the terminal 200 is configured to determine a characteristic of the link between the serving access node 100-1 and the further terminal 200'. This may be accomplished by receiving a measurement report of the further terminal 200'. This measurement report may be generated by the further terminal 200', communicated from the further terminal to the access node 100-2, and then communicated from the access node 100-2 to the access node 100-1. In addition or as an alternative, this may be accomplished by means of a measurement of a reference signal received from the further terminal 200' at the access node 100-1, e.g. a measurement of the received signal strength, a measurement of the path gain, a measurement of the latency, or the like.

This link characteristic may be used as a basis for deciding whether the access node 100-2 should be used as a supporting access node or not. Specifically, this characteristic may be used to determine whether the signal 10-1' transmitted by the further terminal 200' and received at the serving access node 100-1 will strongly interfere with the signal 10-1 transmitted by the terminal 200 and received at the serving access node 100-1. In addition, the characteristic of the link determined by the access node 100-1 may also comprise scheduling information of the link between the access node 100-1 and the further terminal 200', e.g. frequency resources and/or time resources used for transmitting the signals 10-1' and 10-2'. Such scheduling information is typically available at the serving access node of the further terminal 200', i.e. the access node 100-2, and can therefore be communicated from the access node 100-2 to the access node 100-1.

The first access node 100-1 may request information relating to the signal 10-2 from the second access node 100-2, e.g. by sending a request message 22 or a subscribe message 22' to the second access node 100-2. The second access node, which receives the signal 10-2, obtains information relating to the signal 10-2, e.g. in accordance with one ore more parameters and/or type information in the request from the first access node 100-1. The second access node 100-2 can further obtain information relating to the signal 10-2' from the second terminal 200'. If the second access node 100-2 is the serving access node for the second terminal 200', the second access node 100-2 does not necessarily have to obtain the requested information from the received signal 10-2', but may determine the information from a storage or memory, in which communication parameters like modulation scheme or code rate for signals exchanged with the second terminal 200' are stored.

The second access node 100-2 can then send a response comprising the information relating to the signal 10-2 and/or the information relating to the signal 10-2' to the first access node 100-1. As mentioned above, the latter information may be obtained from the received signal 10-2' or, in the case the second access node 100-2 is the serving access node for the second terminal 200', from a storage or memory. The information relating to the signal 10-2 and the information relating to the signal 10-2' may be sent in a single response message 24 or publish message 24', or in separate response messages 24 or in separate publish messages 24'. Details concerning the request messages 22, the subscribe messages 22', the response messages 24, or the publish messages 24' are explained below.

The obtaining and sending of information relating to the signal 10-2' from the further terminal 200' by the second access node 200' may be triggered by the request from the first access node 100-1, e.g. the request may in addition comprise type information or one or more parameters for specifying dedicated information relating to the signal 10-2' from the further terminal 200'. Alternatively, the request may not comprise such additional request information. In the latter alternative, the second access node 100-2 may be configured to obtain and send such information relating to the signal 10-2' from the further terminal 200', or to signals from further terminals, to the first access node 100-1, e.g. for any signal from any further terminal in general or if a signal from a further terminal matches a given threshold or based on location-based information, e.g. for the first terminal 200 and the second terminal 200' being located in close vicinity at the respective edges of the coverage areas of the first access node 100-1 and second access node 100-2, where signal interference may be more significant.

The first access node 100-1 can then determine the optimized signal based on information relating to the signal 10-1, on the received information relating to the signal 10-2, and on the received information relating to the signal 10-2'. This can be of advantage if the signal received at the first access node 100-1 is a superposition of signals 10-1 and 10-1'. According to an embodiment, the optimized Rx signal is determined by using the information relating to the signal 10-2' to remove or mitigate the signal 10-1' from the signal 10-1, e.g. by means of an interference cancellation (IC) mechanism. In addition, combining the information relating to the signal 10-1 with the information relating to the signal 10-2 or selecting one of the information relating to the signal 10-1 and the information relating to the signal 10-2, can lead to a further optimization.

The above description in connection with of FIGS. 2 and 3 has been written from the perspective of inter-base-station cooperation. For section-to-section cooperation, reference sign 100-1 may denote a first section and reference sign 100-2 a second section. If the access nodes 100-1 and 100-2 are sections of a single base station, interfaces R12, T12, R22, T22 may be internal interfaces of the base station, e.g. for communication between two processing boards in the same base station rack. In this case, connection of transmission and receiving units R12, T12 with transmission and receiving units T22, R22 (as depicted) may be via the backplane of the base station server rack or via a computer bus if the two sections are located at the same physical location.

In the following processes for selection of supporting access nodes according to embodiments of the invention will be further explained. In this description, reference is made to a serving BS and more supporting BSs. However, it is to be understood that other types of access nodes could be used as well, e.g. different sections of one or more BS.

For cooperative transmission or reception of communication signals, it is desirable to determine which BS or which BSs should participate as supporting BS. This decision is typically made in the serving BS 100-1, e.g. the BS which has the radio resource control (RRC) signalling connection to the UE 200 or any other kind of particular association to the UE 200.

Before actually selecting one or more supporting BSs, the serving BS 100-1 identifies a UE 200 requiring cooperation. Such a UE 200 may be located at a cell edge and suffer from low carrier strength and/or high co-channel interference. Furthermore, such an UE 200 can have the urgent need to transmit data, e.g., it may have already transmitted a scheduling request or a buffer status report etc. to the serving BS 100-1.

For each UE 200 that requires cooperation, the serving BS 100-1 can compile a set of potentially supporting BSs. For this purpose, it can use a measurement report of the UE 200, which was established for identifying potential handover candidate BSs. Typically, the measurement report will thus show BSs which are potential handover target BSs. However, here the measurement report may also serve to identify BSs whose signals are received within a certain level of quality at the UE 200. Such measurement reports are typically sent in regular intervals to the serving BS 100-1 which can determine the set of potentially cooperating BS therefrom.

For example, the measurement report may indicate BSs having the best wireless channels towards the given UE 200. All the indicated BSs qualifying as potential handover candidates, sometimes referred to as active set, may then be included into a list of potentially supporting BSs. The list of potentially supporting BSs might be—alternatively or in addition—based on location information of BSs, it might be based on the deployment structure and the physical connection of BSs, it might be configured by O&M systems, or it might be pre-configured during system setup.

That list of potentially supporting BSs can be further reduced, i.e. a pre-selection can be carried out, by applying one or more of the following steps and evaluating one or more of the following characteristics:

Cooperative reception is particularly beneficial when the radio link quality to the supporting BS is close to the link quality to the serving BS. Thus, the difference in signal quality ($\Delta RSS$) between potentially supporting co-channel BSs, denoted by $R_c$, and serving BS, denoted by $R_s$, could serve as one parameter to select supporting BSs. According to some embodiments, the list of candidates is reduced to BSs whose $\Delta RSS$ is below a certain threshold $\Delta RSS_{thresh}$, i.e. fulfils the relation $|R_s - R_c| < \Delta RSS_{thresh}$.

BSs may have different limitations with respect to their backhaul transport link, e.g. some may be connected via fibre, others via a wired conncetion (e.g. via E1), some even via a wireless connection, e.g. self-backhauling (e.g. via LTE links). Thus, the backhaul limitation of potentially supporting BSs may serve as parameter to select supporting BSs. According to some embodiments, the list of candidates may thus be reduced to BSs whose backhaul is able to cope with the additional load due to cooperation. The information about the currently available backhaul capacity of certain BSs could be exchanged via a BS-BS interface, e.g. the inter-BS interface X2 according to the 3GPP specifications. For example, this could be accomplished during handovers, or it could be provided by the O&M system. The maximum backhaul capacity, which may be several Gbps for fiber, several hundreds of Mbps for DSL, several tens of Mbps for microwave, or several Mbps for leased lines, could even be preconfigured at system setup.

The backhaul capacity of the serving BS 100-1 might be a limiting factor as well. The more supporting BSs are cooperating with the serving BS 100-1, the more data has to be received by the serving BS 100-1. Thus, the backhaul limitation of the serving BSs 100-1 may serve as parameter to limit the number of supporting BSs. Accordingly, the list of candidates may be limited to the maximum number of BSs that can be handled by the backhaul capacity of the serving BS 100-1.

Wireless communication protocols typically contain various more or less strict timing constraints regarding, e.g. HARQ and Automatic Repeat Request (ARQ) feedback or re-transmissions, measurements reports, random access, or the like. Cooperative communication has to meet basically the same tight timing constraints. Thus, the latency of the backhaul information exchange can serve as a parameter to select supporting BSs. According to some embodiments, the list of candidates may thus be reduced to BSs whose latency (or the latency of the transport network providing the connection for cooperation) is below a certain limit. A tough limit may lead to a situation in which a given BS only cooperates with co-channel BSs to which it has a direct physical link. The information about the latency could be provided by the O&M system or it could be preconfigured at system setup. In IP networks, the serving BS 100-1 can gather round-trip times, e.g., by sending Internet Control Message Protocol (ICMP) echo request packets to the potentially supporting BS and listening for ICMP "echo response" (also known as "ping"). As an alternative or in addition, the serving BS 100-1 can measure the response time with respect to other BSs during communication via a BS-BS interface, e.g. the inter-BS interface X2 according to the 3GPP specifications. For example, this may be accomplished during handovers.

If more than one UE requires cooperation the sets of potentially supporting BSs may influence each other. For instance if a co-channel BS is part of two different sets, it might be beneficial to cooperate with this BS for both UEs. In this case, a signalling overhead may be reduced because the exchanged requests and responses, i.e. request messages 22 and response messages 24, or subscribe messages 22' and publish messages 24', may carry information of both UEs at once.

The exchanged information. e.g. Rx signals, demodulated bits or decoded bits, is typically the more valuable the higher the signal quality during reception at the supporting BS is. For example, the signal quality may be high if there are no simultaneous transmissions going on in the supporting BS's cell. In turn, the signal quality may be low if there are simultaneous transmissions in the supporting BS's cell, which are causing interference to the Rx signal from the UE. The probability of simultaneous transmissions can be approximated by the load of the supporting BS. According to some embodiments, the load of a BS may thus be used as a measure to reduce the set of potentially supporting BSs. All candidate BSs whose cell load is above a certain threshold may be removed from the candidate set. The cell load of co-channel cells could be gathered via a BS-BS interface. Inter-cell interference coordination (ICIC) schemes as specified by 3GPP allow to exchange a cell load indicator, which may be used for reducing the list of potentially supporting BSs as well.

It is to be understood that the order of above-described steps can be modified based on the priorities of vendors/operators or based on the implementation or that only some of the above described steps may be used.

Accordingly, determining a set of one or more BSs potentially suited for obtaining and sending information to the serving BS 100-1 for optimizing the signal at the serving BS 100-1 may be accomplished based on at least one of the following selection criteria:

a characteristic, e.g. quality, load, and/or latency, of a link from the terminal 200 to the serving BS as compared to a characteristic of a link from the terminal 200 to at least one further BS, a characteristic of a link, e.g. quality, load, and/or latency, between the serving BS and at least one further BS, a capacity of the serving BS, a relation of at least one further BS to the terminal 200 and to at least one further terminal, a load of at least one further BS, location information of at least one further BS in relation to location information of the serving BS, operation and maintenance information related to at least one further BS, and pre-configuration information related to at least one further BS.

Information relating to the above-mentioned criteria may be sent from further BSs, which are potentially suited as supporting BS, to the serving BS 100-1.

Having compiled the final set of potentially cooperating BSs, the serving BS requests 100-1 cooperation from all BSs of that set. The message exchange, according to the request-response mechanism or according to the publish-subscribe mechanism, is performed for each of the supporting BSs individually. However, it is to be understood, that unicast messages, multicast messages and/or broadcast messages may be used as appropriate in order to efficiently use network capacities.

Figure 4:
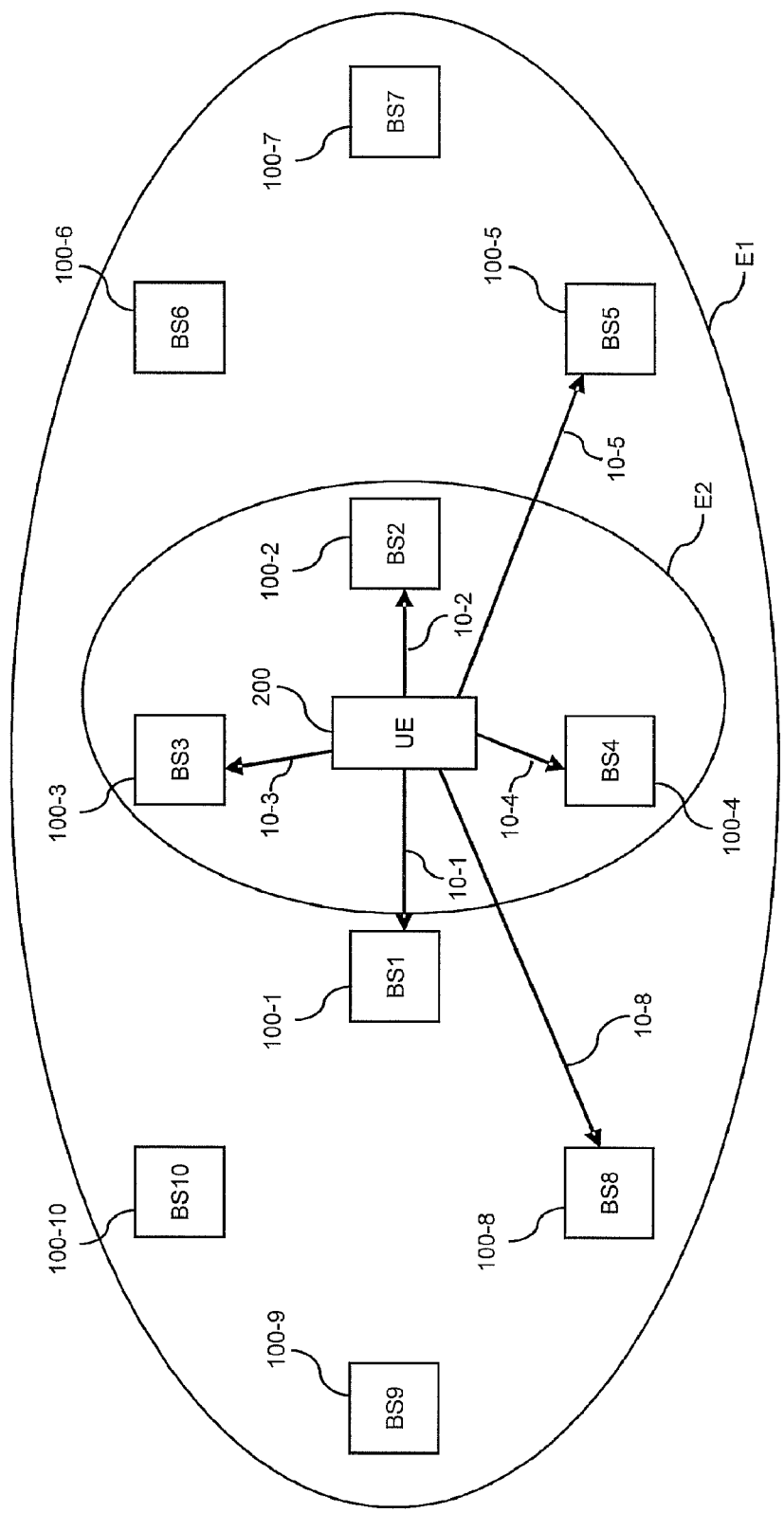
FIG. 4 schematically illustrates a terminal and an ensemble of access nodes, from which a set of access nodes is selected for UL cooperation with respect to the terminal.
Figure 5:
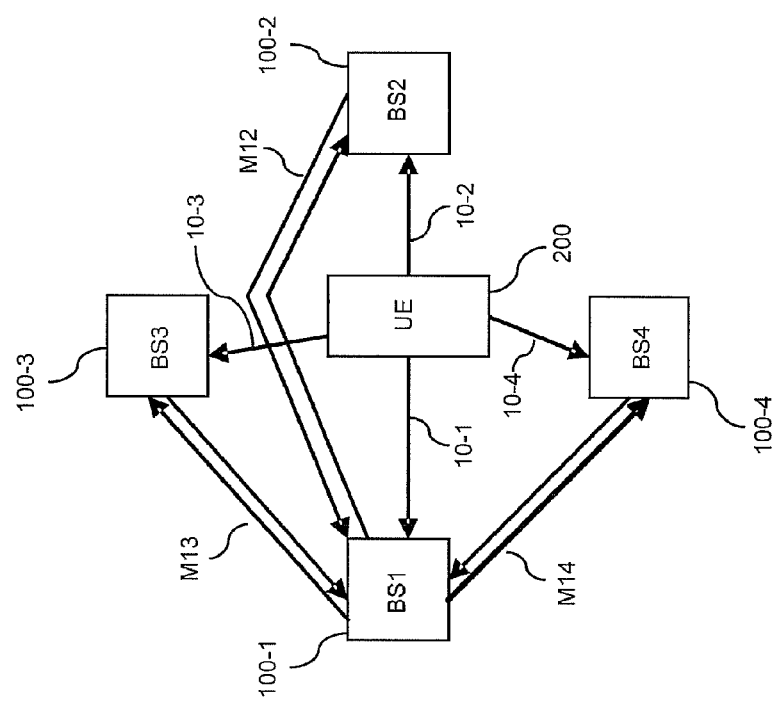
FIG. 5 schematically illustrates the set of selected of access nodes in FIG. 4, and communication between access nodes of the set and the terminal.

The above concepts of selecting cooperating BSs are further illustrated in FIGS. 4 and 5.

FIG. 4 depicts an ensemble E1 of access nodes 100-1, 100-2, 100-3, 100-4, 100-5, 100-6, 100-7, 100-8, 100-9, 100-10 or BSs (BS1-BS10) of a communication network. Access node 100-1 is the serving access node for terminal 200. The Tx signal of the terminal 200 is received at access nodes 100-1, 100-2, 100-3, 100-4, 100-5, and 100-8, i.e. at BS1-BS5 and BSB. The serving access node 100-1 can determine a set E2 of one or more access nodes of the ensemble E1 that are potentially suited for supporting the serving access node 100-1. According to the example, the serving access node 100-1 selects the access nodes 100-2, 100-3, and 100-4, i.e. BS2-BS4, for the set E2 and excludes the remaining access nodes, 100-5, 100-6, 100-7, 100-8, 100-9, 100-10, i.e. BS5-BS10. According concepts as further explained in connection with FIGS. 6 and 7, this decision is based on a characteristic of a respective link between the terminal 200 and the access nodes 100-2, 100-3, 100-4, 100-5, 100-6, 100-7, 100-8, 100-9, 100-10. Further, this decision may be based on knowing the location of the terminal 200 which might be too distant from any of the remaining access nodes for receiving of a signal from the terminal 200 at all or at acceptable quality.

In FIG. 5, exchanged messages M12, M13, and M14 exchanged between the serving access node 100-1 and the supporting access nodes 100-2, 100-3, and 100-4, respectively, of set E2 are shown. As mentioned above the exchanged messages may be request messages and response messages or subscribe messages and publish messages, and have the purpose of requesting and receiving information relating to a signal received from the terminal 200 at the respective access node 100-2, 100-3, and 100-4 of set E2. It is to be understood that the situation as illustrated in FIGS. 4 and 5 is merely exemplary. As compared to the illustrated situation, in which the set E2 consists of three access nodes, other situations may have only one access node, two access nodes, or more than three access nodes in the set E2. Also, it is to be understood that the total number of access nodes in the communication network may be different.

Figure 6:
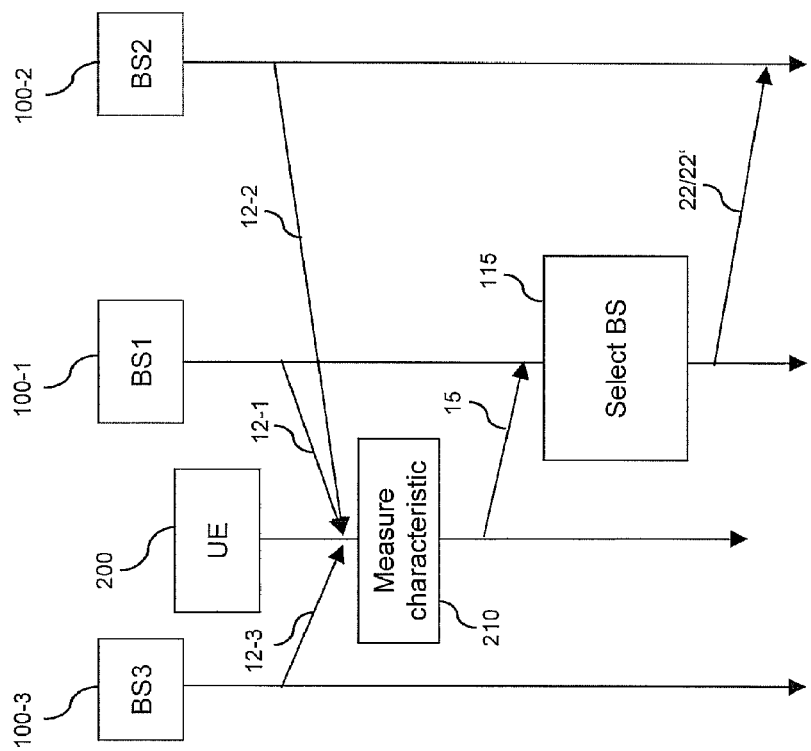
FIG. 6 schematically illustrates supporting access node selection in a process of UL cooperative signal reception according to an embodiment of the invention.

In the following, selection processes according to embodiments of the invention will be described, which may use one or more of the above-mentioned selection criteria. FIG. 6 schematically illustrates, in the form of a signalling diagram, a process of selecting one or more further access nodes as supporting access nodes. In FIG. 6, an exemplary process is illustrated which involves a terminal 200, a serving access node 100-1 of the terminal 200, and further access nodes 100-2, 100-3, from which a supporting access node is selected. The selection process of FIG. 6 corresponds to the above-mentioned first type of link-characteristic based selection and is based on a characteristic of a link between the terminal and the further access node 100-2, 100-3. The access nodes 100-1, 100-2, 100-3 are illustrated as BSs (BS1, BS2, BS3). However, it is to be understood that the access nodes 100-1, 100-2, 100-3 may also be different sections of one or more BSs and may correspond to different cells of a communication network.

As illustrated, the access nodes 100-1, 100-2, 100-3 each transmit DL signals 12-1, 12-2, 12-3 to the terminal 200. Specifically, the access node 10-1 transmits a DL signal 12-1 to the UE200, the access node 100-2 transmits a DL signal 12-2 to the UE200, and the access node 100-3 transmits a DL signal 12-3 to the terminal 200. The DL signals 12-1, 12-2, 12-3 may be reference signals, e.g. include reference symbols dedicated for measurement purposes.

At measurement step 210, the terminal 20 measures one or more characteristic of the links to the different access nodes 100-1, 100-2, 100-3. That is to say, the terminal 200 may measure a characteristic of the link between the access node 100-2 and the terminal 200 and a characteristic of a link between the access node 100-3 and the terminal 200. In addition, the terminal 200 may also measure a characteristic of a link between the access node 100-1 and the terminal 200. The latter characteristic may then be used as a basis for making a comparison with respect to the other characteristics. According to some embodiments, the measurements may be carried out in the process of generating a path gain measurement report. Accordingly, it is also possible to reuse already existing path gain measurement reports of the terminal 200. In other embodiments, other measurement reports or dedicated measurements may be used.

The measured characteristics are then communicated to the serving access node 100-1 in a message 15. As mentioned above, this message 15 may correspond to a message for communicating a path gain measurement report.

In selection step 115 the serving access node 100-1 then makes a selection of supporting access nodes on the basis of the measured link characteristics. Specifically, the serving access node 100-1 may select those further access nodes, for which the measured characteristic indicates a sufficiently high signal quality. For example, access nodes having links with a signal quality above a certain threshold may be selected. This threshold may be defined as an absolute value or may be defined with respect to a reference value which is based on the respective characteristic of the link between the serving access node 100-1 and the terminal 200, i.e. the characteristic of the link between the terminal 200 and the further access node 100-2, 100-3 as compared to the characteristic of the link between the terminal 200 and the serving access node 100-1 may be used as a selection criterion. For example, the above mentioned difference in signal quality, denoted by ΔRSS could be used as a selection criterion. Here, it is to be noted that the value ΔRSS could actually be obtained on the basis of a variety of values which are indicative of the signal quality, e.g. received signal strength, path gain, or the like. In this way, access nodes can be selected as supporting access nodes for which the signal quality on the respective link is close to the signal quality on the link between a serving access node 100-1 and the terminal 200.

In the exemplary process of FIG. 6, the access node 100-2 is selected as supporting access node. The serving access node 100-1 then requests cooperation from the selected supporting access node, which is accomplished by sending a request message 22 or a subscription message 22' to the selected supporting access node 100-2. The process of UL cooperative signal reception may then continue as explained in connection with FIGS. 11 and 12.

Figure 7:
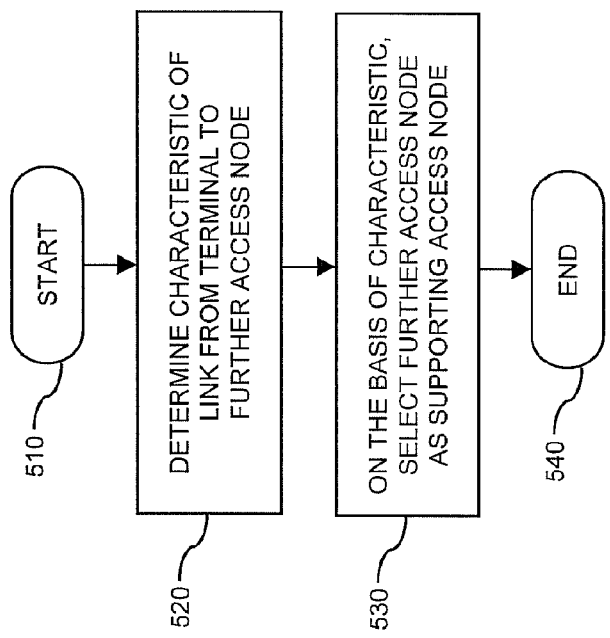
FIG. 7 shows a flowchart for illustrating a method of supporting access node selection according to an embodiment of the invention.

FIG. 7 shows a flow-chart for illustrating a method of selecting one or more supporting access node in accordance with the concepts as explained in connection with FIG. 6.

The method relates to the selection of one or more supporting access nodes for UL cooperative signal reception from a terminal, e.g. the terminal 200, associated with a serving access node, e.g. the serving access node 100-1.

The method starts at step 510.

At step 520, a characteristic of a link from the terminal to a further access node, e.g. the access node 100-2 or 100-3, is determined. The characteristic may comprise a signal quality, e.g. a received signal strength, a path gain, time-related signal information such as a latency, or the like. The characteristic may be determined from a measurement report of the terminal, e.g. a path gain measurement report. The measurement report may be obtained directly from the terminal or may be obtained via the further access node. The characteristic may also be determined from a measurement on a reference signal transmitted from the terminal to the further access node. In the latter case, the method may also comprise transmitting scheduling information of the reference signal from the serving access node to the further access node. The scheduling information of the reference signal may then be used by the further access node when evaluating the reference signal.

At step 530, the determined characteristic is used as a basis for selecting the further access node as supporting access node. That is to say, it is decided whether the further access node should participate as supporting access node in the process of UL cooperative signal reception.

The method ends at step 540.

After selecting one or more supporting access node in accordance with the method of FIG. 7, the process of UL cooperative signal reception from the terminal may continue by requesting, from the selected supporting access node, information relating to a signal received from the terminal at the supporting access node, e.g. the signals 10-2, 10-3, 10-4 as illustrated in FIG. 5. The requested information is then received at the serving access node. At the serving access node, it is then possible to receive a signal from the terminal, e.g. the signal 10-1 as illustrated in FIG. 5, taking into account the information relating to the signal received at the supporting access node. Further details of the cooperation process are explained in connection with FIGS. 11 and 12.

In the process of selecting one or more supporting access node as explained in connection with FIGS. 4 to 7, already existing path gain measurement reports of the terminal can be reused. Accordingly, the additional outlay for implementing the process is reduced. Moreover, no additional signalling between access nodes is required. By selecting supporting access nodes having a link with a good signal quality with respect to the terminal, the use for carrier signal energy can be increased, thereby enhancing the SINR. As a consequence, also the data throughput of the terminal can be increased.

Figure 8:
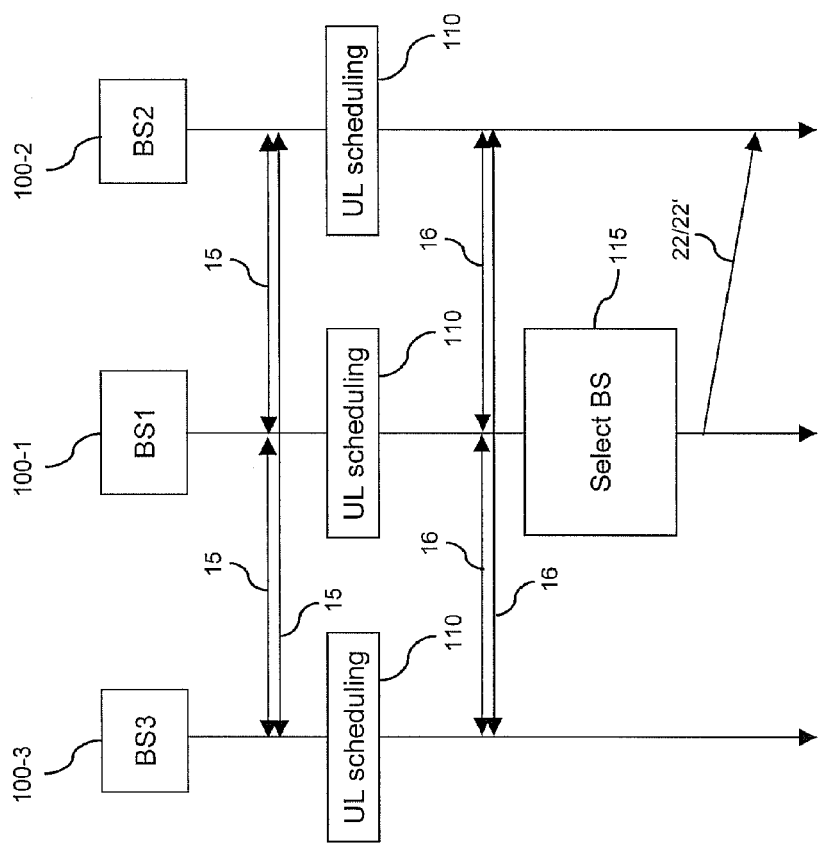
FIG. 8 schematically illustrates supporting access node selection in a process of UL cooperative signal reception according to a further embodiment of the invention.

FIG. 8 schematically illustrates, in the form of a signalling diagram, a further process of selecting one or more further access nodes as supporting access nodes. In accordance with the above mentioned second type of link-characteristic based selection, this process aims at reducing interfering signal energy at the serving access node.

Similar to FIG. 6, FIG. 8 illustrates a serving access node 100-1 and further access nodes 100-2, 100-3. A terminal associated with the serving access node 100-1 is not illustrated.

It is assumed, that the further access nodes 100-2, 100-3 each have associated further terminals (not illustrated), for which they act as serving access nodes. The signals transmitted by these further terminals and received at the serving access node 100-1 are a possible source of interference, and it is desirable to mitigate this interference by probably selecting one or more supporting access node from the further access nodes 100-2, 100-3.

For this purpose, the serving access node 100-1 receives information relating to characteristics of the links between the further access nodes 100-2, 100-3 and their respective further terminals. This is accomplished by exchanging messages 15 and 16. The messages 15 comprise information relating to signal quality, e.g. received signal strength, path gain, or latency. The messages 16, which are exchanged after UL scheduling by the access nodes 100-1, 100-2, 100-3, as indicated by scheduling steps 110, include scheduling information, such as frequency resources, time resources, e.g. LTE resource blocks (RBs) and/or transmit power used for the UL signal transmission between the further access node 100-2, 100-3 and its associated further terminal. In the process of FIG. 8, the scheduling information is mutually exchanged between the access nodes 100-1, 100-2, 100-3. For example, each access node 100-1, 100-2, 100-3 may be configured to communicate scheduling information to its other, e.g. neighbouring, access nodes in response to newly scheduling an UL transmission. However, it is to be understood that it is also possible that the further access nodes 100-2, 100-3 communicate the scheduling information to the serving access node 100-1 as needed, i.e. in response to a respective request from the serving access node 100-1.

At step 115, the serving access node 100-1 then selects one or more supporting access nodes on the basis of the available information concerning the characteristics of the links between the further terminals and the serving access node 100-1. In particular, the serving access node 100-1 identifies those of the further access nodes 100-2, 100-3 which have scheduled the UL transmission from their respective further terminal on the same frequency and/or time resources as the UL transmission from the terminal associated with the serving access node 100-1. That is to say, the selection is based on a comparison between scheduling information of the link between the terminal and its serving access node 100-1 with scheduling information of the link between the further terminal 200', 200" and its associated further access node 100-2, 100-3. The latter scheduling information is the same as for the link between the further terminal 200', 200" and the serving access node 100-1, because it refers to the same UL signal transmitted by the further terminal 200', 200", which received at both the associated further access node 100-2, 100-3 and the serving access node 100-1. Other parameters of the scheduling information, e.g. transmit powers, and signal qualities may be used as an additional basis of the decision. In particular, a high signal quality of the link and/or a high transmit power indicate that the signal transmitted from the further terminal is likely to cause high interference at the serving access node 100-1. Accordingly, supporting access nodes likely to cause high interference can be selected on the basis of the information concerning link characteristics as exchanged in the messages 15, 16.

In the exemplary process as illustrated in FIG. 8, the further access node 100-2 is selected as supporting access node. The serving access node 100-1 may then request information relating to signals received at the selected supporting access node or supporting access nodes by sending a request message 22 or a subscribed message 22'.

Figure 9:
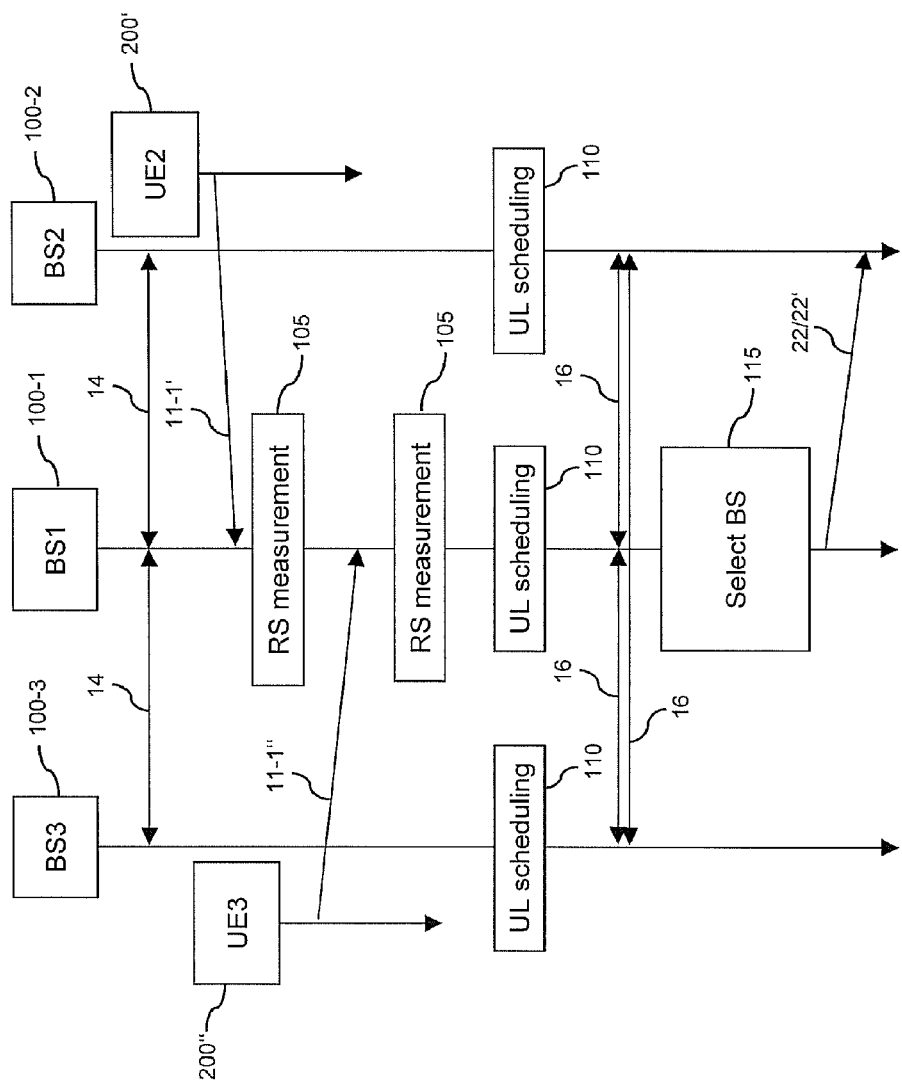
FIG. 9 schematically illustrates supporting access node selection in a process of UL cooperative signal reception according to a further embodiment of the invention.

The process of UL cooperative signal reception may then continue as explained in connection with FIGS. 11 and 12. An alternative process for implementing the second type of link-characteristic based selection is illustrated in FIG. 9. In FIG. 9, elements which are similar to those of FIG. 8 have been designated by the same reference signs, and further information concerning these elements can be obtained from the description in connection with FIG. 8.

As compared to the process of FIG. 8, which is based on exchanging measurement reports in the messages 15, the process of FIG. 9 is based on direct measurements of link characteristics performed by the serving access node 100-1.

For implementing this direct measurement, the further access nodes 100-2, 100-3 first communicate to the serving access node 100-1 scheduling information of the respective reference signal, e.g. information concerning frequency resources and time resources on which their respective associated further terminal 200', 200" transmit the respective reference signal 11-1', 11-1". In the process of FIG. 9 this is accomplished by having the access nodes 100-1, 100-2, 100-3 exchanging respective messages 14. Here, it is to be noted that in the illustrated process the messages 14 are actually exchanged between the further access nodes 100-2, 100-3 and the serving access node 100-1 and vice versa. However, in some embodiments it may also be sufficient if the further access nodes 100-2, 100-3 communicate the respective information to the serving access node 100-1. The scheduling information of the reference signals 11-1', 11" may comprise information relating to a symbol sequence of the reference signal, the time-frequency resources and/or the Tx power used to transmit the reference signal. Further, the scheduling information of the reference signal may also comprise a code, or a polarization used for the reference signal. Moreover, the scheduling information may also comprise spatial information, e.g. related to beamforming techniques or an arrangement of different antennas used for the reference signal.

As illustrated, the further terminal 200' (denoted as UE2) associated with the access node 100-2 transmits a reference signal 11-1' to the serving access node 100-1, and the further terminal 200" (denoted as UE 3) associated with the access node 100-3 transmits a reference signal 11-1" to the serving access node 100-1. The reference signals 11', 11-1" may correspond to the Sounding Reference Signal (SRS) as defined for 3GPP to measure sound signal quality. Other types of dedicated reference signals may be used as well. When using dedicated reference signals, the transmit power of reference symbols can be boosted as compared to the usual signal transmission so as to improve the estimation of the signal quality. As an alternative or in addition, regular reference symbols as used for demodulation purposes may be included in the reference signals 11-1', 11-1".

At reference signal measurement steps 105, the serving access node 100-1 evaluates the respective reference signals 11-1', 11-1" as received from the further terminals 200', 200". On the basis of the reference signal measurements, a characteristic of the link between the further terminal 200' and the serving access node 100-1 and a characteristic of the link between the further terminal 200" and the serving access node 100-1 are determined. These characteristics may be a received signal strength, a path gain, a latency, or the like.

At scheduling steps 110, the access nodes 100-1, 100-2, 100-3 each schedule UL transmissions from their respective associated terminals. Scheduling information is then communicated between the access nodes 100-1, 100-2, 100-3. Here, it is to be understood that according to the process of FIG. 9 the scheduling information is mutually exchanged between the access nodes 100-1, 100-2, 100-.3. For example, each access node 100-1, 100-2, 100-3 may be configured to communicate scheduling information to its other, e.g. neighbouring, access nodes in response to newly scheduling an UL transmission. However, it is to be understood that it is also possible that the further access nodes 100-2, 100-3 communicate the scheduling information to the serving access node 100-1 as needed, i.e. in response to a respective request from the serving access node 100-1.

At selection step 115, the serving access node 100-1 selects one or more supporting access node from the further access nodes 100-2, 100-3. This process is similar to that as already explained in connection with the process of FIG. 8.

In the exemplary process of FIG. 9, the further access node 100-2 is selected as supporting access node. The process of UL cooperative signal reception may then continue with the serving access node 100-1 requesting information relating to a signal received by the supporting access node 100-2 by sending a request message 22 or a subscription message 22' to the selected supporting access node 100-2.

Figure 10:
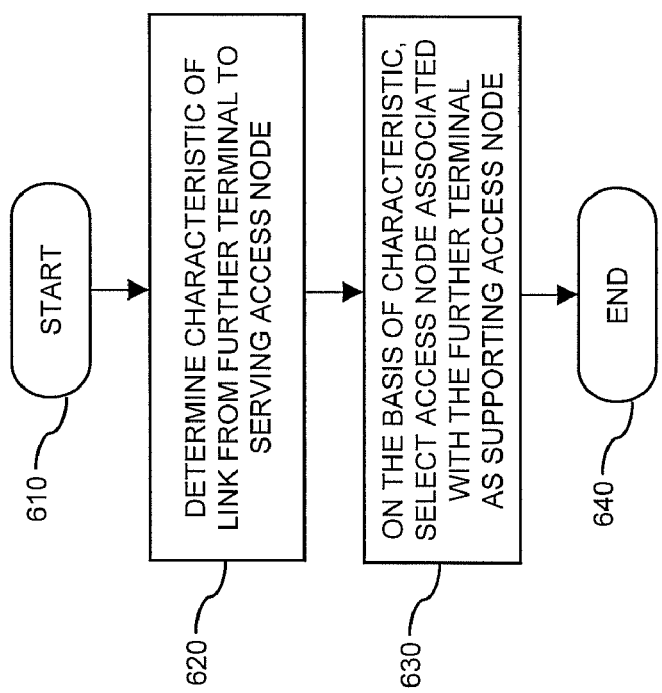
FIG. 10 shows a flowchart for illustrating a method of supporting access node selection according to a further embodiment of the invention.

FIG. 10 shows a flow-chart for schematically illustrating a method of selecting one or more supporting access node in accordance with the concepts as explained in connection with FIGS. 8 and 9.

The method relates to the selection of one or more supporting access nodes for UL cooperative signal reception from a terminal, e.g. the terminal 200, associated with a serving access node, e.g. the serving access node 100-1.

The method starts at step 610.

At step 620, a characteristic of a link from a further terminal, e.g. the further terminal 200' or 200" to the serving access node is determined. The further terminal is associated with a further access node, e.g. the further access node 100-2 or 100-3, serving the further terminal, i.e. operating as a serving access node with respect to the further terminal. The determined characteristic may comprise a signal quality of the link, e.g. a received signal strength, a path gain, time-related signal information such as a latency, or the like. Such a signal-quality related characteristic may be determined from a measurement report of the further terminal. Alternatively or in addition, it is also possible that the serving access node measures the characteristic, e.g. on the basis of reference signals received from the further terminal. In the latter case, the method may also comprise transmitting scheduling information of the reference signal from the further access node to the serving access node, and receiving the scheduling information of the reference signal at the serving access node. The scheduling information of the reference signal may then be used by the serving access node when evaluating the reference signal.

In addition, the characteristic may comprise scheduling information, e.g. frequency resources, time resources, and/or a Tx power as used by the further terminal for transmitting an UL signal to its associated further access node. Further, the scheduling information may also comprise a code, or a polarization used by the further terminal for transmitting the UL signal. Moreover, the scheduling information may also comprise spatial information, e.g. related to beamforming techniques or an arrangement of different antennas used by the further terminal for transmitting the UL signal. Since the further access node is the serving access node of the further terminal, such scheduling information is available at the further access node and may be communicated to the serving access node of the terminal.

At step 630, the serving access node selects, on the basis of the determined characteristic, the further access node associated with the further terminal as supporting access node. That is to say, it is decided whether the further access node should participate as supporting access node in the process of UL cooperative signal reception or not. This decision may be based on the scheduling information, e.g. whether the further terminal uses the same frequency resources and/or time resources as the terminal associated with the serving access node. For example, it may be determined whether the further access node has scheduled its associated further terminal on the same RBs on which the serving access node has scheduled its associated terminal. In addition, this decision may be based on an expected interfering signal strength at the serving access node. This expected interfering signal strength can be concluded from the transmit power included in the scheduling information or from the determined signal quality related characteristic, e.g. received signal strength, path gain, latency, or the like.

The method ends at step 640.

Having selected one or more supporting access node in accordance with the method as illustrated in FIG. 10, UL cooperative signal reception may continue by the serving access node requesting, from the selected supporting access node, information relating to a signal received from the further terminal at the supporting access node. The requested information is then received at the serving access node. At the serving access node, a signal from the terminal is then received taking into account the information received from the supporting access node. For example, this may involve interference cancellation at the serving access node, which may be accomplished on the basis of samples of the received signal at the supporting access node, e.g. In-Phase-Quadrature (IQ) samples.

Further details of the cooperation process are explained in connection with FIG. 11 or 12.

It is to be understood that the processes and methods of selecting supporting access nodes for UL cooperative signal reception as explained in connection with FIGS. 4 to 7 and as explained in connection with FIGS. 8 and 9 can be combined to a hybrid method. In such a case, the serving access node can apply the first type of link-characteristic based selection as explained in connection with FIGS. 4 to 7 to select a group of supporting access nodes collecting a large amount of the carrier signal energy received from the terminal. In addition, the serving access node can select a further group of supporting access nodes in accordance with the second type of link-characteristic based selection as explained in connection with FIGS. 8 and 9, so as to reduce interference using the information received from these supporting access nodes.

According to some embodiments, when using a hybrid method, access nodes may be selected as supporting access nodes until an available backhaul capacity as needed for implementing the UL cooperative signal reception is fully utilized. For example, supporting access nodes may be added in the order of an estimated gain obtained by the UL cooperative signal reception, e.g. an estimated increase in the bit rate. In a hybrid method, the estimated gain when selecting a supporting access node in accordance with the first type of link-characteristic based selection can be compared to the estimated gain when selecting a supporting access node in accordance with the second type of link-characteristic based selection, and the access node providing the higher gain can then be selected as supporting access node. The comparison can be made on a per-access node basis or can be made on the basis of groups of access nodes or even network portions. The concept of comparing an estimated gain which can be obtained by the different methods can help to enhance the overall gain obtained by means of cooperation, without excessive demand of backhaul capacity. This can be beneficial if backhaul capacity for communicating between different access nodes is limited.

In the following, processes of UL cooperation according to embodiments of the invention will be described, which may be used in connection with the devices and selection methods as described above. In these processes, it is assumed that a set of one or more supporting access nodes has already been determined, e.g. using the concepts as explained in connection with FIGS. 4-10.

Figure 11:
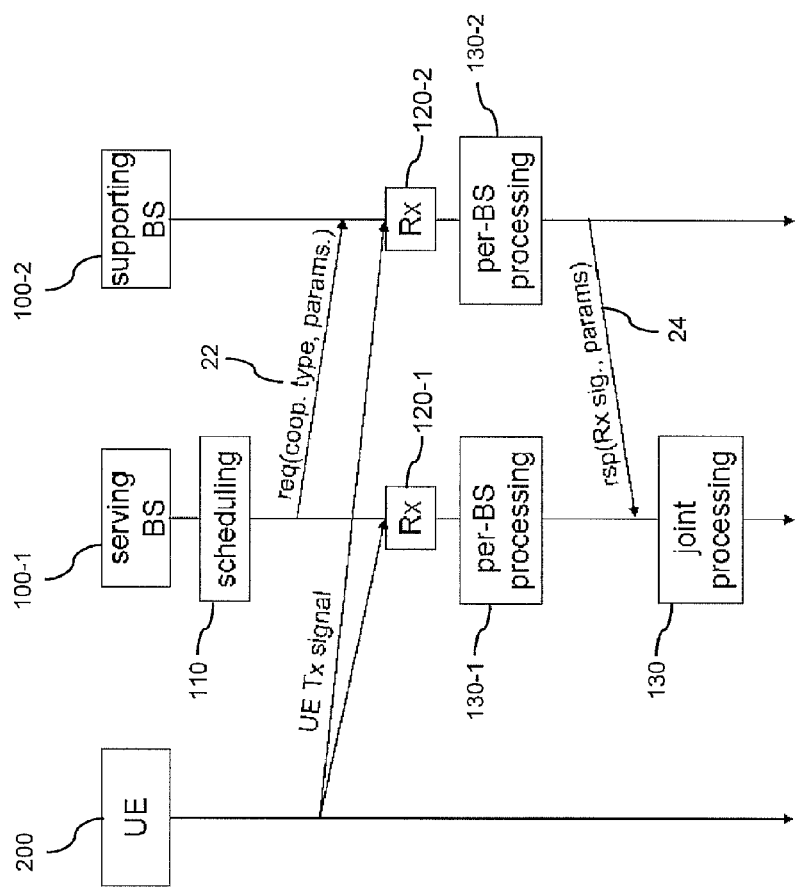
FIG. 11 schematically illustrates an example of a process for UL cooperation between access nodes according to an embodiment of the invention.

FIG. 11 schematically illustrates a first example of an process of UL cooperation between the first access node 100-1, here depicted as a serving BS, and the supporting access node, here depicted as a serving BS. The terminal 200 is depicted as a UE. It is to be understood that the first access node 100-1 and the second access node 100-2 could also be different sections of the same BS or sections of different BSs. Further, it is to be understood that more than one supporting access node 100-2 could be provided.

The UE 200 is associated to the serving BS 100-1. The serving BS 100-1 controls the UE 200 and allocates resources for communication. This may be part of a scheduling step 110. The UE 200 has already been identified as a candidate for UL cooperation. Having allocated certain resource blocks (RBs) to the UE 200, the serving BS 100-1 make a request for support from the supporting BS 100-2 with respect to the particular UE 200, by sending a request message (req) 22 to the supporting BS 100-2. The request message 22 can e.g. indicate which type of information is required. The information may relate to the Rx signal 10-2 received from the terminal 200, e.g., IQ samples, demodulated coded data (soft bits) such as LLRs, decoded user data, such as hard bits, etc. The request information may also relate to an Rx signal received at the supporting access node 100-2 from a further terminal (not illustrated) associated with the supporting access node 100-2. As explained in connection with FIG. 3, such information may be useful when implementing UL cooperative signal reception on the basis of an IC mechanism. Furthermore, the request message 22 can comprise additional parameters which are required to deliver the requested information, e.g., time slots, transmission time intervals (TTIs), and RBs to be received, or parameters for Interference Cancellation (IC) at the supporting BS 100-2. More detailed examples of parameters in the request 22 message are provided below.

On the indicated RBs, the supporting BS 100-2 receives the Rx signal 10-2 from the UE 200, as indicated by reception step 120-2. The Rx signal 10-1 from the UE 200 is received at the serving BS 100-1 in reception step 120-1. Depending on the requested type of information relating to the Rx signal, the supporting BS 100-2 might need to process the Rx signal 10-2 as received from the UE 200, as indicated by per-BS processing step 130-2. Typically, the processing on a per-BS basis in the supporting BS 100-2 will be similar to processing on a per BS basis in the serving BS 100-1, e.g. as performed in a per-BS processing step 130-1. For instance if decoded user data is requested, the supporting BS 100-2 demodulates and decodes the Rx signal 10-2 as received from the UE 200. More detailed examples of processing on a per-BS basis are given below. The process is similar if information relating to an Rx signal received from a further terminal is requested. In this case, the Rx signal is received by the supporting BS 100-2 from the further terminal.

After per-BS processing the supporting BS 100-2 responds by sending a response message (rsp) with the requested information, i.e. the Rx signal 10-2 having the type as specified in the request, to the serving BS 100-1. Alternatively, the supporting BS 100-2 may also respond with a related type of information. Additionally, the supporting BS 100-2 can transmit parameters used by the serving BS 100-2, e.g. parameters used for IC at the serving BS 100-2.

Having received the requested information from the supporting BS 100-2, the serving BS 100-1 can jointly process the Rx signals received by itself and by the supporting BS 100-2. This is accomplished in a joint processing step 130. Depending on the type of the requested information, the serving BS 100-1 can, e.g., select the successfully coded bit stream (selection combining), can do soft combining of coded soft bits, or can do interference rejection combining or IC in case of IQ sample exchange. As a result, the serving BS 100-1 determines an optimized signal on the basis of the signals 10-1 and 10-2 received from the terminal 200.

In the above, the concept of cooperation is outlined for only one supporting BS 100-2. If the serving BS 100-1 has identified multiple supporting BSs, the presented process is individually performed for each supporting BS. That is to say, the serving BS 100-1 requests cooperation from each supporting BS. The request messages 22 can be transmitted as unicast message, as multicast message or, depending on the circumstances, even as broadcast message. Each supporting BS responds with the requested information, i.e. the Rx signal having the type as specified in the request. Further, each supporting BS may cancel or disregard the request. The supporting BS 100-2 may also respond not with the requested type of information, but with a related type. For example, the serving BS 100-1 may request decoded bits, but the supporting BS 100-2 may respond with soft values of demodulated bits because the supporting BS 100-2 is not able to decode the Rx signal 10-2, e.g. due to low reception quality or due to a lack of decoding capability. The information of the related type still be helpful in optimizing the signal at the serving BS 100-1. Finally, the joint processing at the serving BS 100-1 combines and processes the Rx signals received at its own antennas and at the supporting BS or BSs.

In the process of FIG. 11, cooperation is requested before the serving BS 100-1 performs processing of its own Rx signals 10-1 on a per-BS basis, i.e. before the serving BS 100-1 receives the Rx signal 10-1. This approach may be referred to as a proactive approach. In an alternative approach, which may be referred to as a reactive approach, cooperation is requested after per-BS processing at the serving BS 100-1, i.e. after the actual reception of the Rx signal 10-1 at the serving BS 100-1. This may be beneficial, e.g., if the serving BS's 100-1 own decoding attempt failed. Having received the requested information, e.g. the Rx signal 10-2 in the form of IQ samples, from the supporting BS 100-2 or from multiple supporting BSs, the serving BS 100-1 may do a second attempt to decode the Rx signal 10-1 from the UE 200. For this purpose, the Rx signal 10-1 may be stored for a certain time at the serving BS 100-1. Similarly, the Rx signal 10-2 may be stored for a certain time at the supporting BS 100-2. For example, the Rx signal 10-1 and/or the Rx signal 10-2 may be stored for a period from the reception of the Rx signal until the required information has been obtained from the Rx signal 10-1, 10-2. The reactive approach allows for reducing the amount of data to be exchanged between the serving BS 100-1 and the supporting BS 100-2.

The process as illustrated in FIG. 11 is based on a request-response mechanism, in which the serving BS sends a request message and the supporting BS responds with a response message including the requested information. In some embodiments, the request-response mechanism may be replaced by a subscribe-publish mechanism. A corresponding process is illustrated in FIG. 12.

Figure 12:
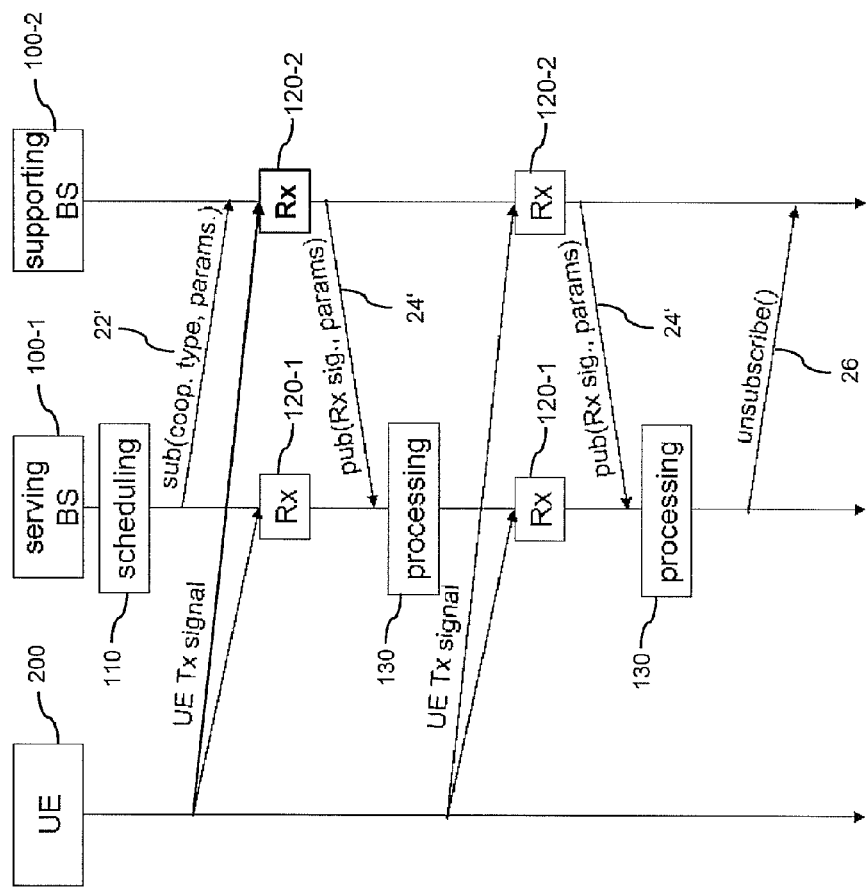
FIG. 12 schematically illustrates a further example of a process for UL cooperation between access nodes according to an embodiment of the invention.

In the process of FIG. 12, which is based on the subscribe-publish mechanism, a BS 100-2 offers to publish the received Rx signal 10-2 to everyone that has subscribed to that "service". The offer together with capabilities of the BS 100-2, e.g. implemented receiver algorithms, backhaul constraints, number of antennas, etc., may be announced to other BSs directly or to an O&M system of the communication network. An interested serving BS 100-1 subscribes to the offered service, which may e.g. be "IQ sample transfer", and the offering BS 100-2 then becomes a supporting BS 100-2. For this purpose, the serving BS 100-1 sends a subscribe message (sub) 22' to the supporting BS 100-2, and the supporting BS then sends at least one publish message (pub) 24' including the requested information to the serving BS 100-1. The publish message 24' may be sent several times with further, updated information relating to the Rx signal 10-2. Sending of the publish messages 24' may be stopped in response to the serving BS 100-1 sending an unsubscribe message 26 to the supporting BS 100-2. Here it is to be noted that in the process the subscribe message 22' may be regarded as a request for information relating to the Rx signal 10-2.

The subscribe message 22' may contain all relevant information or parameters that are also part of the request message as explained in connection with FIG. 11. The publish message 24' may contain the Rx signal 10-2, e.g. in the form of IQ samples, as well as additional parameters that are also part of the response message as explained in connection with FIG. 11.

The subscription of the serving BS 100-1 to the service offered by the supporting BS 100-2 may be cancelled when the information relating to the Rx signal 10-2, e.g. IQ samples, of that particular supporting BS 100-2 are no longer needed. For this purpose, the serving BS 100-1 may send the unsubscribe message 26. Other cancelling procedures may be used as an alternative or in addition.

The subscribe-publish mechanism allows for establishing long-term relationships between BSs with reduced overhead, e.g., for persistent scheduling where RBs are allocated in a sequence of TTIs.

Further details concerning the cooperation process, e.g. different options of the type of requested information relating to the Rx signal 10-2 at the supporting BS 100-2, are explained in co-pending PCT application PCT/EP2009/055157, which is incorporated herein by reference.

It is to be understood that the above concepts, examples and embodiments are merely illustrative and are susceptible to various modifications. For example, in the above-described methods and processes, steps or procedures may be executed according to the order as described or in a different order. Further, it is also possible to omit certain steps or procedures without departing from the scope of the present disclosure. Moreover, individual features of different examples or embodiments may be combined with each other as appropriate.

The invention claimed is:

1. A method for cooperatively receiving an uplink signal from a first terminal served by a first access node, the method comprising:
    determining at least one of:
        a first characteristic of a first link from the first terminal to a second access node that serves a second terminal; and
        a second characteristic of a second link from the second terminal to the first access node;
    determining a third characteristic of a third link between the first terminal and the first access node; and
    selecting the second access node to support cooperative reception of the uplink signal, based on a comparison of the third characteristic with at least one of the first characteristic and the second characteristic.

2. The method according to claim 1, wherein at least one of:
    the first characteristic comprises a signal quality of the first link; and
    the second characteristic comprises a signal quality of the second link.

3. The method according to claim 1, further comprising:
    receiving, at the first access node, a measurement report for the first link; and
    determining the first characteristic based on the measurement report.

4. The method according to claim 1, further comprising:
receiving, at the first access node, a measurement report for the second link; and
determining the second characteristic based on the measurement report.

5. The method according to claim 1, comprising:
receiving, at the first access node, a reference signal from the second terminal; and
determining the second characteristic based on the received reference signal.

6. The method according to claim 5, further comprising receiving, at the first access node, scheduling information for the reference signal.

7. The method according to claim 1, further comprising transmitting, from the first access node to the second access node, scheduling information for a reference signal transmitted by the terminal.

8. The method according to claim 1, wherein at least one of:
the first characteristic comprises scheduling information for the first link; and
the second characteristic comprises scheduling information for the second link.

9. The method according to claim 1, wherein the third characteristic comprises a signal quality of the third link, and wherein said comparison is between at least one of:
the signal quality of the third link and a signal quality of the first link; and
the signal quality of the third link and a signal quality of the second link.

10. The method according to claim 1, further comprising:
receiving, at the first access node, a measurement report for the third link; and
determining the third characteristic based on the measurement report.

11. The method according to claim 1, further comprising:
receiving, at the first access node, a reference signal from the terminal; and
determining the third characteristic based on the received reference signal.

12. The method according to claim 1, wherein the third characteristic comprises scheduling information for the third link, and wherein said comparison is between the scheduling information for the third link and scheduling information for the second link.

13. A first access node configured to serve a first terminal and to cooperatively receive an uplink signal from that first terminal, and the first access node comprising a processor configured to:
determine at least one of:
a first characteristic of a first link from the first terminal to a second access node that serves a second terminal; and
a second characteristic of a second link from the second terminal to the first access node;
determine a third characteristic of a third link between the first terminal and the first access node; and
select the second access node to support cooperative reception of the uplink signal, based on a comparison of the third characteristic with at least one of the first characteristic and the second characteristic.

14. The first access node according to claim 13, wherein at least one of:
the first characteristic comprises a signal quality of the first link; and
the second characteristic comprises a signal quality of the second link.

15. The first access node according to claim 13, further comprising a receiving unit configured to receive a measurement report for the first link, and wherein the processor is configured to determine the first characteristic based on the measurement report.

16. The first access node according to claim 13, further comprising a receiving unit configured to receive a measurement report for the second link, and wherein the processor is configured to determine the second characteristic based on the measurement report.

17. The first access node according to claim 13, further comprising a receiving unit configured to receive a reference signal from the second terminal, and wherein the processor is configured to determine the second characteristic based on the received reference signal.

18. The first access node according to claim 17, wherein the receiving unit is configured to receive scheduling information for the reference signal.

19. The first access node according to claim 13, further comprising a transmitting unit configured to transmit, from the first access node to the second access node, scheduling information for a reference signal transmitted by the terminal.

20. The first access node according to claim 13, wherein at least one of:
the first characteristic comprises scheduling information for the first link; and
the second characteristic comprises scheduling information for the second link.

21. The first access node according to claim 13, wherein the third characteristic comprises a signal quality of the third link, and wherein said comparison is between at least one of:
the signal quality of the third link and a signal quality of the first link; and
the signal quality of the third link and a signal quality of the second link.

22. The first access node according to claim 13, further comprising a receiving unit configured to receive a measurement report for the third link, and wherein the processor is configured to determine the third characteristic based on the measurement report.

23. The first access node according to claim 13, further comprising a receiving unit configured to receive a reference signal from the terminal, and wherein the processor is configured to determine the third characteristic based on the received reference signal.

24. The first access node according to claim 13, wherein the third characteristic comprises scheduling information for the third link, and wherein said comparison is between the scheduling information for the third link and scheduling information for the second link.

25. A computer program product stored on a non-transitory computer-readable medium and comprising code that, when executable by a processor of a first access node, cause the first access node to serve a first terminal and to cooperatively receive an uplink signal from that first terminal, the code causing the first access node to:
determine at least one of:
a first characteristic of a first link from the first terminal to a second access node that serves a second terminal; and
a second characteristic of a second link from the second terminal to the first access node;
determine a third characteristic of a third link between the first terminal and the first access node; and
select the second access node to support cooperative reception of the uplink signal, based on a comparison of the third characteristic with at least one of the first characteristic and the second characteristic.

* * * * *

UNITED STATES PATENT AND TRADEMARK OFFICE
CERTIFICATE OF CORRECTION

PATENT NO. : 8,942,758 B2  
APPLICATION NO. : 13/120766  
DATED : January 27, 2015  
INVENTOR(S) : Hoymann et al.

Page 1 of 1

It is certified that error appears in the above-identified patent and that said Letters Patent is hereby corrected as shown below:

In the specification

In Column 3, Line 4, delete "a BS." and insert -- a BS --, therefor.

In Column 11, Line 23, delete "one ore" and insert -- one or --, therefor.

In Column 13, Line 19, delete "conncetion" and insert -- connection --, therefor.

In Column 14, Line 13, delete "information." and insert -- information, --, therefor.

In Column 15, Line 12, delete "and BSB." and insert -- and BS8. --, therefor.

In Column 15, Line 64, delete "access node 10-1" and insert -- access node 100-1 --, therefor.

In Column 16, Line 3, delete "terminal 20" and insert -- terminal 200 --, therefor.

In Column 21, Lines 64-65, delete "an process" and insert -- a process --, therefor.

In the claims

In Column 25, Line 6, in Claim 5, delete "comprising:" and insert -- further comprising: --, therefor.

Signed and Sealed this  
Sixteenth Day of February, 2016

Michelle K. Lee  
*Director of the United States Patent and Trademark Office*